Oct. 4, 1932. J. E. LOVE ET AL 1,881,411
PEA HARVESTER
Filed July 13, 1931  2 Sheets-Sheet 2
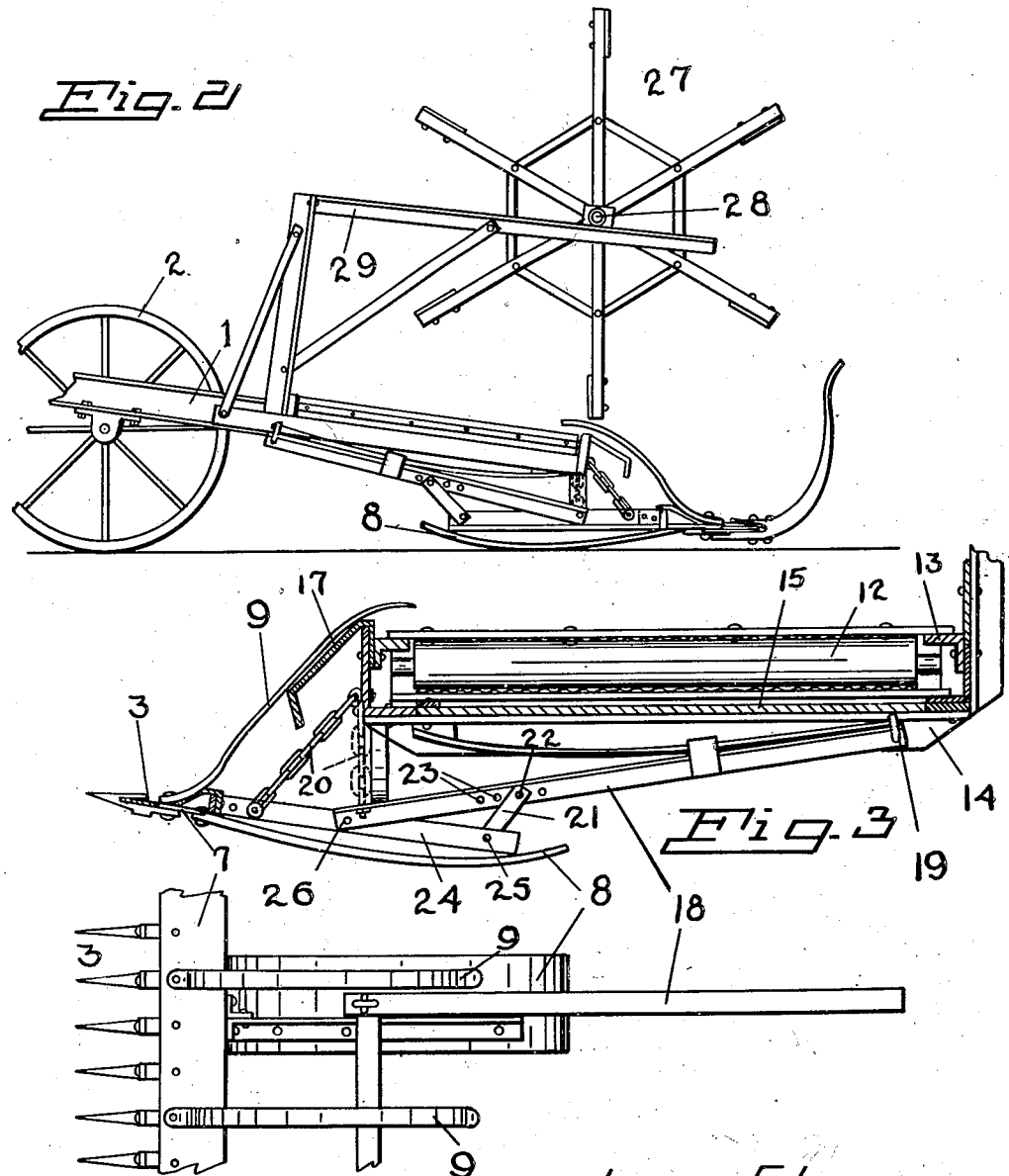
James E. Love
Horace D. Hume
Inventor
By Herbert S. Smith
Attorney Patented Oct. 4, 1932.

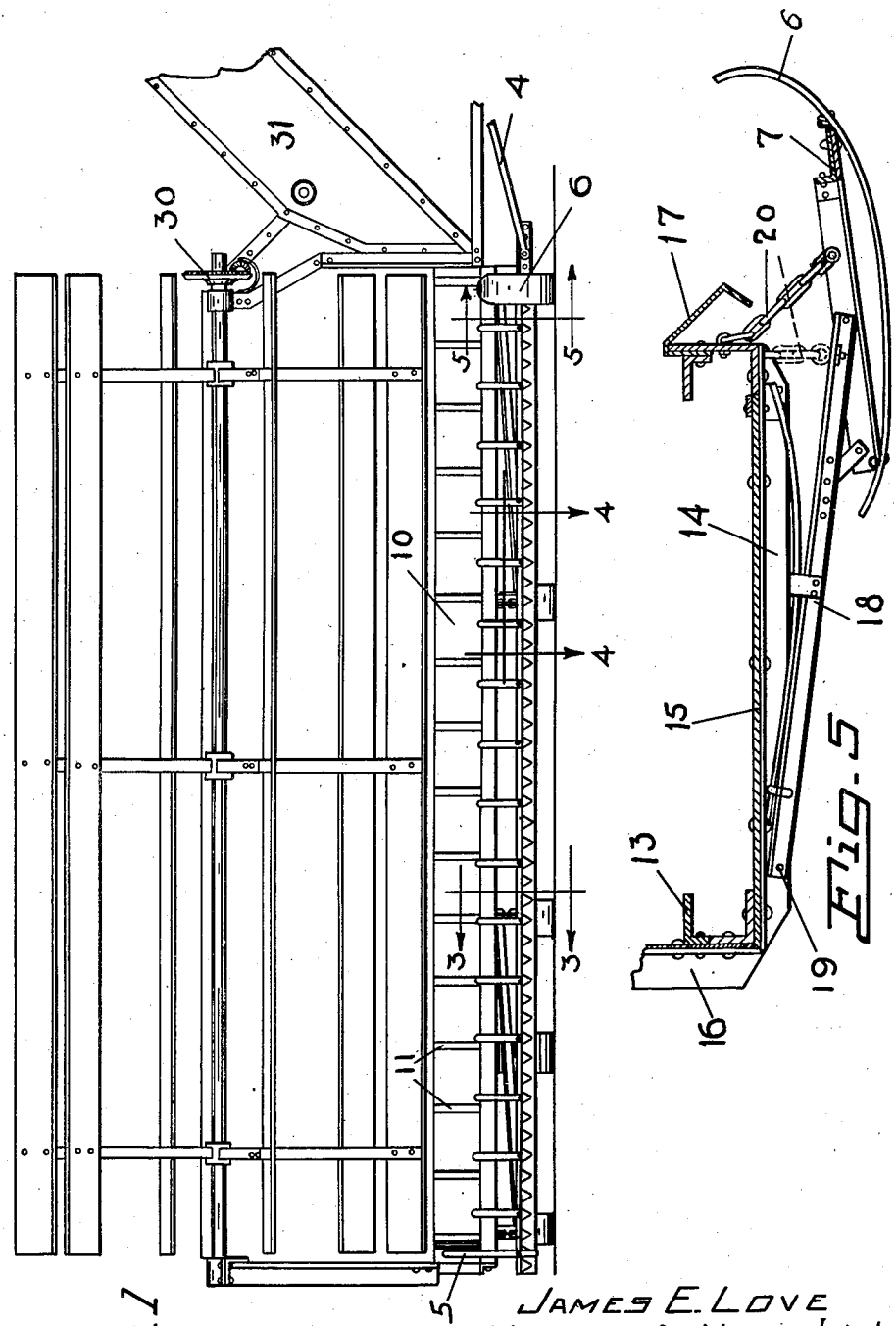

1,881,411

UNITED STATES PATENT OFFICE

JAMES E. LOVE AND HORACE D. HUME, OF GARFIELD, WASHINGTON

PEA HARVESTER

Application filed July 13, 1931. Serial No. 550,320.

Our present invention relates to an improved pea harvester or agricultural implement of the reciprocating cutter or sickle type, employing a transversely hinged and adjustable cutter frame, rotating reel with horizontal axis, and transversely extending draper or endless conveyer by means of which the harvested pea vines are delivered to a properly arranged threshing machine, as for instance, by means of an elevator located at one side of the harvester.

As it is well known to those familiar with the harvesting of field peas, the plants or vines lie close to the ground, and in efficient harvesting operations the vines must be cut close to the roots. The sickle or cutter is required to travel as close as possible to the ground in order that only the stalks may be cut, and to avoid cutting through the vines, as well as to avoid threshing out and losing the seed pods as the cutter performs its operations.

The primary object of our invention is to construct, arrange, and combine the cutter frame and the draper frame and their accessories in such manner that the cutters or sickle will sever the stalks close to the ground, regardless of the contour of the ground over which the harvester is passing, and in order that the cutter may adapt itself to irregularities on the ground over which it passes, to insure proper harvesting of the peas.

Our invention consists in certain novel combinations and arrangements of parts as will hereinafter be more fully set forth and claimed. In the accompanying drawings we have illustrated one complete example of the physical embodiment of our invention wherein the parts are combined and arranged according to one mode we have thus far devised for the practical application of the principles of our invention.

Figure 1 is a front elevation of so much of a combined harvester and threshing machine as is necessary to illustrate the use of our invention.

Figure 2 is a view in side elevation as seen from the left in Figure 1.

Figure 3 is an enlarged detail view showing the draper and frame and sickle in section, together with the means for suspending the cutter frame from the draper frame, as at line 3—3 of Figure 1.

Figure 4 is an enlarged detail top plan view of a portion of the cutter, as at lines 4—4 of Figure 1.

Figure 5 is a cross section of the draper table or trough and frame and the cutter frame and sickle bar, with means for relatively adjusting the parts.

In order that the general arrangement and relation of parts may readily be understood we have shown in Figures 1 and 2 the front portion of a harvester equipped with our invention, and the main frame of the harvester is designated as 1 with a usual supporting wheel 2. The reciprocating cutter or sickle 3 extends transversely across the front of the implement and a portion of an operating rod or connecting rod is indicated at 4 in Figure 1. The end guards 5 and 6 are mounted as usual on the cutter frame 7, and the rearwardly extending shoes 8 support the cutter 3 just above the ground, the shoes being curved to permit adjustment of the cutter with relation to the ground surface and yet serve as the proper support for the cutter.

On the cutter frame are spaced at intervals a number of guide fingers or blades 9 having their forward ends secured to the frame and the fingers extend rearwardly and upwardly, as indicated in Figure 3, to guide the vines to the endless belt or draper 10, after the stalks of the vines have been severed by the cutter 3.

The draper or endless conveyer belt extends transversely of the implement, to the rear of the cutter, and is provided with the usual transverse slats 11, and end rollers 12 are journaled at opposite sides of the implement for supporting and driving the belt or draper.

As indicated in Figure 3 the ends of the slats on the upper or working flight of the draper belt are guided over angle iron rails 13 rigid with the frame 14 or the sides of the table 15 for the draper belt, and the frame is supported from the main frame of the implement as by uprights or posts 16 at the ends of the draper frame.

In front of the draper frame and extending transversely of the implement is provided a flat apron 17 secured to the draper frame and declining downwardly and forwardly toward the cutter. The free ends of the upwardly and rearwardly extending guide fingers or blades 9, as seen in Figure 3 project across the face of the apron, and these fingers and the apron guide the harvested vines as they move rearwardly due to the advancing movement of the implement. The free ends of the blades terminate above the front edge of the draper and the vines are guided and delivered to the draper from these free ends of the blades or fingers.

The sickle and its supporting frame are pivotally supported from or hinged to the draper frame in order that the sickle may be adjusted or raised and lowered with relation to the ground surface, and yet travel on its shoes in adjusted position, and the sickle frame is permitted to have an upward movement as it rides over irregularities in the ground surface.

For this purpose we employ a plurality of suspending bars 18 that extend longitudinally of the implement back of the cutter frame and below the draper frame, and at their rear ends these bars are pivoted on transverse pivots 19 to the draper frame. The suspending bars decline toward the front of the implement and at their front ends they are flexibly connected with the front edge of the draper frame as by means of chains 20. The chains 20 permit the suspending bars to swing upwardly, and they prevent the bars from swinging downwardly below a predetermined point or level.

At a suitable location, preferably in front of the center of the bar, a suspending link 21 is pivoted by bolt 22 on the bar, and the bar is provided with a series of bolt holes 23 one of which may be selected for anchoring the link to the bar.

The cutter frame 7 is provided with a plurality of rearwardly extending brace arms 24 complementary to the number of suspending bars, and these brace arms are of appropriate length to have the lower end of the suspending links 21 pivoted thereto as at 25. About midway the length of the brace arms the front ends of the suspending bars are pivoted as at 26. Thus the cutter frame, which rests upon its shoes 5, 6, and 8, is bodily suspended from the draper frame, which is rigid with the main frame of the implement, and the cutter frame is supported from the front and rear of the draper frame. By loosening the bolts 22 in Figure 3, the links 21 may be swung on their pivots 25, to the right and secured to the bars 18 for lowering the cutter, or they may be swung to the left on pivots 25 and secured in a bolt hole 23 for adjusting and retaining the cutter a greater distance above the ground, depending upon the conditions met with in harvesting.

The harvested vines are transferred from the fingers 9 to the draper with the assistance of a rotary reel 27 extending transversely of the implement and located just above the rear ends of the fingers 9. The reel is journaled at 28 in the frame 29, secured to and located above the main frame, and in Figure 1 driving means are indicated at 30 for rotating the reel clockwise in Figure 2.

By means of the reel the vines are transferred to the draper, and the latter conveys them transversely of the implement to an elevator or inclined conveyor 31, by means of which the harvested vines are carried to the thresher.

The spring shoes, as indicated in Figures 1 and 2 and the wheel 2 thus support the front part of the implement so that the shoes ride smoothly along the surface of the ground with the cutters in adjusted position the desired space above the ground, to sever the stalks of the vines, and as the implement advances, the severed vines are bodily moved to the rear without materially disturbing the peas, and thence conveyed as described to the threshing machine. The invention may be embodied in the harvesting machines during their process of manufacture, or existing harvesting machines of this type may be converted for use with the attachment of our invention without material changes or alterations, and with comparatively slight cost.

Having thus fully described our invention, what we claim as new and desire to secure by Letters Patent is:—

1. The combination in a harvesting machine with a draper frame and a cutter frame, of pivotal means for suspending the cutter frame from the draper frame to permit independent movement of the cutter frame, and means for adjusting the cutter frame to bring the cutter nearer to or farther from the ground surface.

2. The combination in a harvesting machine with a draper frame and a cutter frame, of a plurality of suspending bars hinged at their rear ends beneath the draper frame, flexible connections between the draper frame and the front ends of said bars, pivotal connections between said cutter frame and the front ends of the bars, and adjustable links connecting the cutter frame and said bars back of the flexible connections.

3. The combination in a harvesting machine with a draper frame and a cutter frame, of a plurality of suspending bars pivotally supported at their rear ends on the draper frame and chains connecting the front ends of said bars and the draper frame, complementary brace arms on the cutter frame and pivotal connections between said arms and bars, and adjusting links connecting the rear ends of the brace arms with said bars.

4. The combination in a harvesting machine with a draper frame and a cutter frame and a hinged suspension device on the draper frame, of brace arms on the cutter frame and pivotal connections between said arms and the suspension device, and adjustable links connecting said brace arms with the suspending device.

5. The combination in a harvesting machine with a draper frame and a front apron thereon, of a cutter frame and spaced, longitudinally extending guide fingers secured thereon for co-action with the apron, suspending means joining the draper frame and the cutter frame, and means for adjusting the cutter frame with relation to the draper frame.

6. The combination in a harvesting machine with a draper frame and a front apron thereon, of a cutter frame and spaced, longitudinally extending guide fingers secured thereon for co-action with the apron, a rotary reel above the draper frame and the rear ends of said fingers, hinged suspending bars supported from the draper frame, brace arms on the cutter frame and pivotal connections between said arms and bars, and adjusting links connecting said arms and bars.

In testimony whereof we affix our signatures.

JAMES E. LOVE.
HORACE D. HUME.